H. T. HUGHES.
ANTISKID TREAD FOR RESILIENT TIRES.
APPLICATION FILED JAN. 6, 1913.
1,130,693.
Patented Mar. 2, 1915.
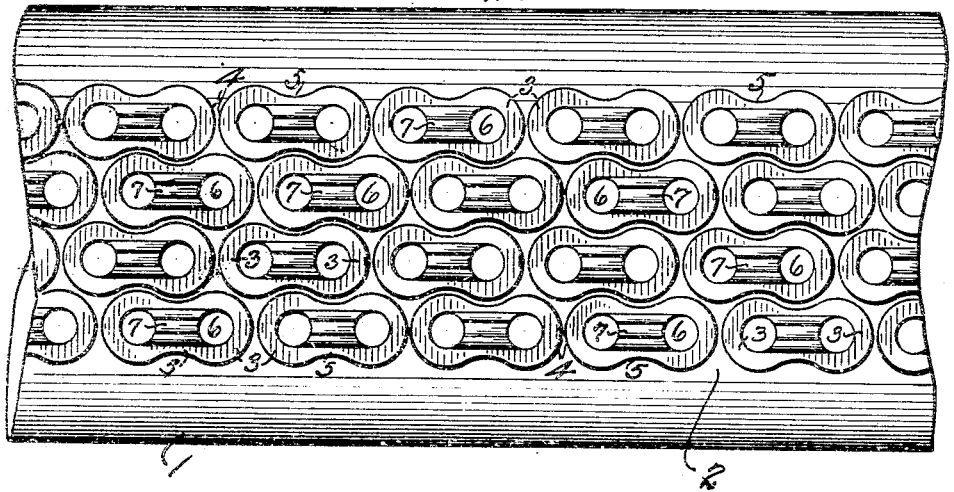
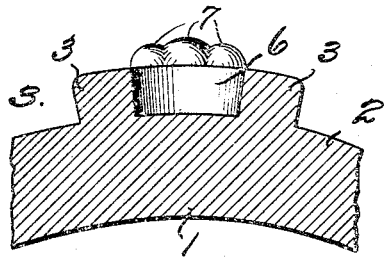
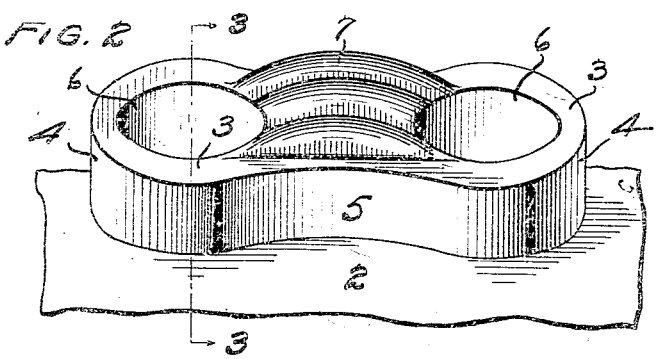
Witnesses
Emory L. Groff
Agnes A. Johnston
Inventor
Hugh T. Hughes
By W.C. Carman
Attorney

UNITED STATES PATENT OFFICE.

HUGH T. HUGHES, OF YOUNGSTOWN, OHIO, ASSIGNOR OF ONE-HALF TO ISAAC WILKOFF AND LEO S. WILKOFF, BOTH OF YOUNGSTOWN, OHIO.

ANTISKID TREAD FOR RESILIENT TIRES.

1,130,693.  Specification of Letters Patent.  Patented Mar. 2, 1915.

Application filed January 6, 1913. Serial No. 740,420.

*To all whom it may concern:*

Be it known that I, HUGH T. HUGHES, a citizen of the United States, residing at Youngstown, in the county of Mahoning and State of Ohio, have invented certain new and useful Improvements in Antiskid Treads for Resilient Tires, of which the following is a specification.

This invention relates to the subject of resilient tires for vehicles, and more particularly to tires of this type which are usually employed on the wheels of motor vehicles, having in view a novel and practical improvement in the tread construction for tires of this character.

To this end, the primary object of the invention is to provide a tread construction applicable to the external traction surface of any make of resilient or pneumatic tire, and which tread construction is so designed as to provide means which will effectually prevent skidding of the vehicle wheel, while at the same time possessing strength and durability.

In this connection, a special object of the invention is to provide an anti-skid tread construction for resilient tires which substantially covers the entire traction or running surface of the tire body, so as to present a maximum contact with the ground, while at the same time embodying features which insure a firm gripping engagement between the tread and the ground in such a manner as to greatly improve the traction of the wheels, and strongly resist any tendency to lateral slipping or "skidding."

With these and other objects in view which will be readily apparent to those skilled in the art as the details of the invention are better understood, the same consists in the novel construction, combination, and arrangement of parts as hereinafter more fully described, illustrated, and claimed.

While the invention may be susceptible of minor changes in the form and construction of parts, a preferred and practical embodiment thereof is illustrated in the accompanying drawings, in which—

Figure 1 is a plan view of a section of a resilient tire for vehicles provided with an anti-skid tread constructed in accordance with the present invention. Fig. 2 is a detail in perspective, enlarged, illustrating the structural characteristics of one of the lug units forming a part of the tread construction. Fig. 3 is a cross sectional view on the line 3—3 of Fig. 2.

Like reference characters designate corresponding parts in the several figures of the drawings.

In carrying out the present invention, no change or alteration is required in the general construction of the tire body, as the improved anti-skid tread is applicable to any of the ordinary makes of pneumatic or resilient tires. Accordingly, for illustrative purposes, the numeral 1 designates a tire body or casing of any suitable construction, the outer tread portion 2 of which is constructed with a multiplicity of offstanding or raised lug units 3 which are preferably of rubber and formed integrally with the said outer tread portion of the said tire body.

The raised lug units 3 are of duplicate and symmetrical construction, each of the same being substantially of the shape of the figure 8. That is to say, each of the raised lug units 3 has an oblong body formed with the rounded or circular ends 4 and the concaved side walls 5 which merge, on sigmoidal lines, into the curved walls of the circular ends 4, thus providing a shape for the lug units which permits a very compact assembly or arrangement thereof upon the outer surface of the tire body.

The compact assembly or arrangement of the lug units 3 is plainly shown in Fig. 1 of the drawings and consists in providing the tire body with a plurality of circumferential rows of said units, with the lug units in each row longitudinally alined, and the lug units in adjacent rows disposed in staggered relation. According to this arrangement of the lug units in parallel circumferential rows and staggered transverse rows, it will be noted that the rounded or circular ends 4 of the lug units in the same row may be disposed in quite close relation, and said rounded or circular ends of the lug units in one row will lie partly within the concaved side portions 5 of the lug units in adjacent rows, so as to secure the close staggering, transversely, of the lug units, as shown in the drawings. It is by reason of this particular arrangement of the lug units that a compact tread of maximum area is provided for the tire body. Referring further to the particular construction of the individual lug units 5, each of the same is provided at both ends thereof with air pockets 6, forming what may be termed vacuum or suction cups for the ends of the lug body, while between the opposite suction cups, the body of each lug unit has formed on the outer side thereof a convexed bearing projection 7 which is preferably longitudinally ribbed to produce transverse scallops or corrugations, as best seen in Figs. 2 and 3 of the drawings.

By reason of the particular construction described, each lug unit necessarily has a suction gripping engagement with the pavement or ground, but the strain or pull incident of this suction effect is relieved by the pressure of the convexed bearing projection 7. Furthermore, the convexed bearing projection 7, on account of its projection beyond the body of the lug and its scalloped or corrugated form, materially contributes to the anti-skid characteristic of the tread surface, and in this connection it will be noted that the scalloped or corrugated form of the bearing projection permits the latter to more easily and readily spread into a flattened condition when engaging the ground, thus adding to its efficiency in preventing lateral slipping or "skidding" of the tire. At the same time, the suction, which is produced and maintained by the suction cups at the ends of the lug units, also contributes to securing such a gripping engagement between the tread and the pavement or ground as to give a strong traction for the wheels, and to resist lateral slipping or skidding.

I claim:

1. A tire body having its tread composed of a plurality of lug units each having suction cups, and also having a ribbed bearing projection on its outer face between the said cups.

2. A tire body having its tread composed of a plurality of lug-units each having suction cups, and a convexed bearing projection formed between the said cups and projecting beyond the plane of the outer face thereof, said projection having a plurality of longitudinal ribs.

In testimony whereof I hereunto affix my signature in the presence of two witnesses.

HUGH T. HUGHES.

Witnesses:
 AGNES A. JOHNSTON,
 WM. BEIGHT.